US011084462B2

(12) United States Patent
Neff et al.

(10) Patent No.: US 11,084,462 B2
(45) Date of Patent: Aug. 10, 2021

(54) METHOD FOR MODIFYING SAFETY AND/OR SECURITY-RELEVANT CONTROL DEVICES IN A MOTOR VEHICLE

(71) Applicant: Bayerische Motoren Werke Aktiengesellschaft, Munich (DE)

(72) Inventors: Albrecht Neff, Unterschleissheim (DE); Michael Pitz, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 100 days.

(21) Appl. No.: 16/013,456

(22) Filed: Jun. 20, 2018

(65) Prior Publication Data

US 2018/0304858 A1 Oct. 25, 2018

Related U.S. Application Data

(63) Continuation of application No. PCT/EP2016/080096, filed on Dec. 7, 2016.

(30) Foreign Application Priority Data

Dec. 21, 2015 (DE) ................... 10 2015 226 236.7

(51) Int. Cl.
*B60R 25/30* (2013.01)
*B60R 25/00* (2013.01)
(Continued)

(52) U.S. Cl.
CPC ........ *B60R 25/307* (2013.01); *B60R 16/0238* (2013.01); *B60R 25/00* (2013.01);
(Continued)

(58) Field of Classification Search
CPC ................................................... B60R 25/307
(Continued)

(56) References Cited

U.S. PATENT DOCUMENTS 5,046,022 A * 9/1991 Conway ............... G05B 19/427
700/250
5,680,313 A * 10/1997 Whittaker ............. G05D 1/024
701/300
(Continued)

FOREIGN PATENT DOCUMENTS

CN 103080720 A 5/2013
CN 103253273 A 8/2013
(Continued)

OTHER PUBLICATIONS

English translation from JPO of JP, 2012-206551,A (2011).*
(Continued)

*Primary Examiner* — Jean Paul Cass
(74) *Attorney, Agent, or Firm* — Crowell & Moring LLP

(57) ABSTRACT

A method and an apparatus includes the monitoring of a control device. If a critical event occurs during monitoring of the control device, the control device is transferred (20) into a safe state, and it is determined whether a problem solution is available for the event that has occurred by way of a parameter modification of the control device in a problem-solving database. If the problem solution is available, a parameter data set is provided. In this regard, the parameter data set includes parameter information relating to a parameter to be modified of the control device. If the parameter information for the control device is valid, the parameter is modified according to the parameter information and the control device is released from the safe state.

18 Claims, 3 Drawing Sheets

(51) Int. Cl.
*B60R 16/023* (2006.01)
*B60W 50/02* (2012.01)
*B60W 50/029* (2012.01)
*G07C 5/00* (2006.01)
*G07C 5/08* (2006.01)

(52) U.S. Cl.
CPC ........ *B60W 50/02* (2013.01); *B60W 50/0205* (2013.01); *B60W 50/029* (2013.01); *B60W 50/0225* (2013.01); *G07C 5/008* (2013.01); *G07C 5/0808* (2013.01)

(58) Field of Classification Search
USPC ........................................................ 701/32.6
See application file for complete search history.

(56) References Cited

U.S. PATENT DOCUMENTS

| | | | |
|---|---|---|---|
| 5,949,776 | A | 9/1999 | Mahany et al. |
| 6,975,247 | B2* | 12/2005 | Kimmet ............ B64D 45/0015 340/945 |
| 8,475,050 | B2* | 7/2013 | Eswara ................... G06T 7/174 384/164 |
| 8,849,494 | B1* | 9/2014 | Herbach .......... B60W 60/0015 701/24 |
| 9,405,293 | B2* | 8/2016 | Meuleau .............. B62D 15/025 |
| 10,328,769 | B2* | 6/2019 | Ferguson ............ G05D 1/0214 |
| 10,331,124 | B2* | 6/2019 | Ferguson ........... G06K 9/00812 |
| 10,361,802 | B1* | 7/2019 | Hoffberg-Borghesani ................. G11B 27/11 |
| 2008/0228680 | A1* | 9/2008 | Chen ..................... G06N 3/0454 706/21 |
| 2009/0177356 | A1 | 7/2009 | Plawecki |
| 2009/0254737 | A1 | 10/2009 | Nogawa et al. |
| 2012/0041635 | A1 | 2/2012 | Johnson et al. |
| 2013/0179006 | A1 | 7/2013 | Nordbruch et al. |
| 2014/0012435 | A1 | 1/2014 | Sugihara |
| 2015/0326535 | A1* | 11/2015 | Rao ...................... H04L 63/029 726/15 |
| 2018/0234446 | A1* | 8/2018 | Conner ............... H04W 12/122 |
| 2018/0373980 | A1* | 12/2018 | Huval ................ G06K 9/00805 |
| 2019/0310634 | A1* | 10/2019 | Hazard .................... G06N 5/04 |
| 2019/0310635 | A1* | 10/2019 | Hazard ................... G06F 17/18 |
| 2019/0339709 | A1* | 11/2019 | Tay ...................... G05D 1/0088 |

FOREIGN PATENT DOCUMENTS

| | | | |
|---|---|---|---|
| CN | 105005222 A | | 10/2015 |
| DE | 10 2012 200 184 A1 | | 7/2013 |
| EP | 1 227 007 A2 | | 7/2002 |
| JP | 2006-29850 A | | 2/2006 |
| JP | 2008-33591 A | | 2/2008 |
| JP | 2012-206551 A | | 10/2012 |
| WO | WO 98/26958 A | | 6/1998 |
| WO | WO 2014/105825 A1 | | 7/2014 |
| WO | WO-2017042702 A1 * | | 3/2017 ............ H04L 67/12 |

OTHER PUBLICATIONS

International Search Report (PCT/ISA/210) issued in PCT Application No. PCT/EP2016/080096 dated Feb. 23, 2017 with English translation (four (4) pages).

German-language Written Opinion (PCT/ISA/237) issued in PCT Application No. PCT/EP2016/080096 dated Feb. 23, 2017 (five (5) pages).

Chinese-language Office Action issued in Chinese Application No. 201680069849.1 dated Jul. 30, 2020 with English translation (20 pages).

Japanese-language Office Action issued in Japanese Application No. 2018-550864 dated Jul. 15, 2020 with English translation (eight (8) pages).

Chinese-language Office Action issued in Chinese Application No. 201680069849.1 dated Apr. 12, 2021 with English translation (20 pages).

* cited by examiner

METHOD FOR MODIFYING SAFETY AND/OR SECURITY-RELEVANT CONTROL DEVICES IN A MOTOR VEHICLE

CROSS REFERENCE TO RELATED APPLICATIONS

This application is a continuation of PCT International Application No. PCT/EP2016/080096, filed Dec. 7, 2016, which claims priority under 35 U.S.C. § 119 from German Patent Application No. 10 2015 226 236.7, filed Dec. 21, 2015, the entire disclosures of which are herein expressly incorporated by reference.

BACKGROUND AND SUMMARY OF THE INVENTION

The present invention relates to a method for modifying safety and/or security-relevant control devices in a motor vehicle, and a corresponding device and a corresponding motor vehicle.

Currently, if malfunctions are detected in control devices, these faults will be corrected either by means of a software update in the service shop, or if this is not feasible, by replacement of the control device in the service shop. In both cases, however, the vehicle must be taken to a service shop.

In addition, it is currently only possible to adapt control devices or vehicle functions to new and/or modified conditions by means of a software update to be performed in the service shop.

In recent times it has also been a more common occurrence for vehicle features or vehicle functionalities and control devices to become compromised. Such security vulnerabilities can also currently only be eliminated by an elaborate software update in a service shop.

Therefore, it would be desirable to provide a means for correcting such malfunctions and faults, or critical events, quickly and without the need for a service visit.

The object of the invention is to propose a means which avoids or at least reduces at least some of the known disadvantages of the prior art.

This and other objects are achieved according to the invention by a method and a corresponding apparatus according to embodiments of the invention.

The method for modifying safety and/or security-relevant control devices in a motor vehicle operates as follows. If a critical event occurs during monitoring of the control device: transferring the control device into a safe state with regard to the critical event. Identifying whether a problem solution is available for the critical event that has occurred by way of a parameter modification of the control device in a corresponding problem solution database. And if the problem solution is available: providing a corresponding parameter data set from the problem solution database, wherein the parameter data set comprises: control device information relating to a control device to be modified; a parameter information item relating to a parameter to be modified of the control device to be modified; and wherein the control unit to be modified corresponds to the control unit of the motor vehicle. Checking, for each parameter information item contained in the parameter data set, whether the corresponding parameter information item relating to the corresponding parameter to be modified of the control device to be modified is valid for the control device of the motor vehicle. And if the corresponding parameter information is valid: modifying the corresponding parameter of the control device of the vehicle in accordance with the corresponding parameter information item, and releasing the control device from the safe state.

These method steps can be executed automatically.

Safety-relevant in the sense of the invention means relevant with regard to safety standards, such as ISO 26262 and standards based on it.

Security-relevant in the sense of the invention means, on the other hand, relevant to access protection, intrusion protection, protection against data corruption and/or data manipulation, manipulation of control devices and the like. Such a data manipulation or else a manipulation of a control device can be made, for example, by a hacking attack from outside of the motor vehicle via a wireless solution.

A critical event in the sense of the invention can be an event that occurs which is security- and/or safety-relevant in regard to a corresponding driving situation and/or a vehicle function or a control device of the motor vehicle.

A safe state with regard to the critical event within the sense of the invention can refer to a state of a corresponding driving situation and/or of a vehicle function or a control device of the motor vehicle, with regard to the safety-relevant function/system/module to be controlled and hence any other related safety-relevant functions/systems/modules, from which no unacceptable risk to life and limb can be caused.

A parameter modification within the sense of the invention can in particular refer to a change in a value of a corresponding parameter of a vehicle function or a control device of the motor vehicle. In this case a default value of the corresponding parameter can preferably be temporarily overwritten. This means that the default value is not lost, but is temporarily stored, preferably in the control device itself. However, a temporary storage of the default value at another location in the motor vehicle is also possible, for example, in a central controller in a central database of default values. For example, the modified parameters can be reset after a certain time limit, and will therefore again be overwritten with the default value. The overwritten value can then be lost. However, it can also continue to be held in storage.

A problem-solving database within the meaning of the invention can refer to a database on a server or in a backend, on which solutions identified for known problems in motor vehicle functions or control devices of motor vehicles are provided.

A control device information within the meaning of the invention refers to an item of information with which a specific control unit can be identified, such as, for example, a serial number, date of manufacture, a firmware number and the like, or even a combination of these information items.

A valid parameter information item within the meaning of the invention means that the corresponding parameter information is designed for the corresponding motor vehicle function or the corresponding control unit.

The teaching according to the invention achieves the advantage that in the event of an occurrence of a critical event, the motor vehicle can search for an appropriate solution for the event that has occurred or vehicle functions or control devices affected thereby, and if successful, it can deploy a corresponding solution for the event that has occurred. This can take place, for example, for a transitional period until a new version of the software can be installed and/or a new control unit to be fitted is available, or else to cover a period of time, for example, until the next service appointment in a service.

According to a further aspect of the invention, an apparatus is provided for modifying safety and/or security-relevant control devices in a motor vehicle. The apparatus includes: a monitoring device for monitoring a safety and/or security-relevant control device of the motor vehicle with regard to a critical event; a transfer device for transferring the control device into a safe state with regard to the critical event; and a modification device, for modifying a corresponding parameter of the control unit of the motor vehicle. The apparatus is configured to execute any method according to the invention.

The teaching according to the invention achieves the advantage that an apparatus can be provided, which in the event of an occurrence of a critical event can search for an appropriate solution to the event that has occurred or vehicle functions or control devices affected thereby and if successful, can deploy a corresponding solution for the event that has occurred.

According to another aspect of the invention, a motor vehicle is provided, wherein the motor vehicle includes any apparatus according to the invention which is configured to execute any method according to the invention.

The teaching according to the invention achieves the advantage that a motor vehicle can be provided, which is configured upon an occurrence of a critical event to search for an appropriate solution for the event that has occurred or vehicle functions or control devices affected thereby, and if successful, to deploy a corresponding solution for the event that has occurred.

In a further aspect of the invention, a computer program product is provided for an apparatus according to the invention, wherein the apparatus can be operated according to any method according to the invention.

The teaching according to the invention achieves the advantage that the method can be executed automatically in a particularly efficient way.

According to yet another aspect of the invention, a data carrier is provided having a computer program product according to the invention.

The teaching according to the invention achieves the advantage that the method can be distributed or stored particularly efficiently on the devices, systems and/or motor vehicles that execute the method.

Before embodiments of the invention are described in greater detail below, it should first be noted that the invention is not limited to the described components or the described method steps. Furthermore, the terminology used does not represent any restriction, but only has an exemplary character. Where the singular is used in the description and claims, this also includes the plural in each case, except where this is explicitly excluded by the context. Method steps, if any, can be executed automatically, unless the context explicitly excludes this.

In the following further exemplary embodiments of the method according to the invention are described.

According to a first exemplary embodiment, the method also comprises the fact that the critical event comprises a safety and/or security-relevant critical event.

This design has the advantage that it can allow a response to safety and/or security-relevant critical events and if a solution for such an event already exists, can deploy this solution to enable a safe onward journey.

According to a further exemplary embodiment, the method also comprises the fact that the corresponding problem solution database can be stored internally to the motor vehicle.

This design has the advantage that known problem solutions can be transmitted from a backend server with a time delay into the vehicle's internal problem solution database, so that even in an area in which no mobile communication connection can be established to the backend server, any problem solutions required can be found. The method in this case works in a so-called off-line mode.

According to a further exemplary embodiment, the method also comprises the fact that the corresponding problem solution database can be stored externally to the motor vehicle.

This design has the advantage that an extensive problem solution database can be maintained for many different types of motor vehicle.

According to a further exemplary design, the method also comprises the fact that the occurrence of the critical event can be triggered from a vehicle-external server and/or a cloud.

This design has the advantage that a known critical event or problem of a vehicle function or control unit, which has not yet become apparent on a motor vehicle, can nevertheless be responded to by a solution to a problem in the vehicle concerned being loaded from the server. In particular in cases where the manufacturer has become aware that a vehicle function and/or a corresponding control unit has been compromised externally, a rapid solution can thereby be provided, in which in the best case, the vehicle user does not even notice.

According to a further exemplary embodiment, the method also comprises: querying the problem solution database to determine whether a critical event has occurred for the control unit. And if a critical event has occurred: retrieval of the critical event from the problem solution database. In this case the problem solution database is queried upon starting the motor vehicle and/or at regular intervals.

This design has the advantage that potential solutions for critical events not yet known to the vehicle, but which may be imminent, can be deployed to the motor vehicle already prior to or when starting to drive.

According to a further exemplary embodiment, the method also comprises the fact that the vehicle is a motor vehicle that can be operated in a highly automated way. In this case the control unit is safety- and/or security-relevant to a highly automated operation of the motor vehicle. In this regard, the critical event comprises a critical event for the highly automated operation of the motor vehicle. And the safe state in this case comprises a safe state with regard to the highly automated operation of the motor vehicle.

A highly automated operation of the motor vehicle within the meaning of the invention means that the vehicle can be operated automatically by means of assistance systems in such a way that the driver of the motor vehicle, although not controlling the motor vehicle him/herself during the highly automated driving, nevertheless continues to have control of and responsibility for the driving process during the highly automated driving mode. An example of such a highly automated driving mode is that of driver assistance systems, which drive the car independently in a traffic jam or a so-called stop-and-go driving mode on a freeway, without the driver having to constantly brake and accelerate themselves.

In principle, however, the method can also be applied in an autonomous driving mode.

In addition, the method may also be used in a conventional driver assistance mode.

This design has the advantage that a highly automated driving of a motor vehicle can be made even safer by allowing solutions to be sought automatically to any critical problems that occur for the highly automated driving.

According to a first exemplary embodiment, the apparatus also comprises a communications device for communication with a server external to the vehicle. In this regard, the vehicle-external server comprises a problem solution database.

A communications device within the meaning of the invention refers to a mobile wireless communication device for communication in a cellular mobile network. This can use a communication device fitted in the motor vehicle, with a vehicle-internal SIM card. However, it is also possible to use a mobile communication device of a user of the motor vehicle, which is connected to the motor vehicle either by wired or wireless means, for example via a Bluetooth link or the like, and which can be used by the motor vehicle accordingly.

This design has the advantage that a widespread means of communication can be provided for the motor vehicle in order to establish a connection to a problem solution database on a backend server or a cloud.

The invention therefore allows specific function parametrizations customized to the vehicle, including the corresponding parts fitted, the driver and the actual driving situation to be generated in the backend and loaded into the vehicle, where these parametrizations can also take account of additional knowledge from the backend, such as weather, traffic, known faults, changing legal framework conditions, changing conditions in other neighboring countries and the like.

Default parametrizations for the functions are stored in the vehicle, which may only enable a limited functionality. In an extreme case, this can mean that a function is disabled until a corresponding parameter data set is available as a problem solution.

EXAMPLES OF USE CASES

Checking hardware numbers and software versions of corresponding control devices in the backend, i.e. on the vehicle-external server, for example, for known problem parts. And if appropriate relevant vehicle properties are identified, which can be interpreted as critical events, then locating and providing a corresponding parameter data set, which can comprise, for example, corresponding function parametrizations or functional restrictions and/or an incomplete function activation of the corresponding control device as parameter information.

Example 1

A specific component, here, a window winder with a specific serial number, a specific age, is not as resilient as assumed in certain countries and so on: there then follows a parametrization of the maximum window winder force/speed by means of a corresponding parameter information in order to protect relevant components in exactly these vehicles. This can be used, for example, permanently or temporarily as a kind of transitional solution, possibly with accompanying restrictions in functionality or convenience, until a revised component is available.

Example 2

To bridge the time taken for the fault analysis, i.e. when the cause or solution is still unclear and being worked on, until the successful implementation of a technical measure in the field: there then follows a parameterization that can be rapidly rolled out, such as, for example, a function downgrade to avoid faults and/or critical safety-relevant or security-relevant scenarios, a workaround to prevent or correct faults, or else a feature deactivation for precisely the affected control devices in the affected vehicles. This can prevent, for example, the need for a costly general software update of all affected vehicles. However, the time until the availability of the software update can also be bridged, for example, so that in this period, for example, no safety-relevant or security-relevant risk persists. In so doing, the vehicle user can be informed of the restrictions or changes instituted, for example, by means of an appropriate message, for example by means of a built-in Human Machine Interface (HMI) of the motor vehicle.

Example 3

At the time of market introduction of a motor vehicle, a new feature is available but this feature is not yet identified as ready for serial production: a deactivation of the function follows as a parameter information item stored in the backend, until a small delta-patch is available and installed. This results in advantages due to a reduction in the scope of an update, reduction of costs and time. Therefore, functions or control devices, which at the time of production are not yet ready for series production, can be installed in a motor vehicle at the time of launch, without fear of malfunction of these control devices.

Thus, partial releases, i.e. in a fine-grained manner, of functions or control units can be enabled via the backend as soon as these partial releases are stable or operate fault-free.

In addition, this can also be useful to take account of laws or changing regulatory conditions in certain countries. For example, an obligation for or a ban on certain functions may exist in some countries. An example of this is a duty or a prohibition on the use of dipped headlights or daytime running lights in daylight hours. By means of a GPS-based localization of the motor vehicle, when an international border is crossed an appropriate parameter data set can be transmitted to the vehicle, to ensure compliance with the relevant legal provisions of the new country.

In addition, convenience-related and customer-specific modifications of the control devices can be enabled. For example, the calculation of optimal parametrizations can take place in the backend, for example, adapted to the usage or driving style of the vehicle user with the motor vehicle, and the parameters can then be deployed using one from a corresponding parameter data set.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
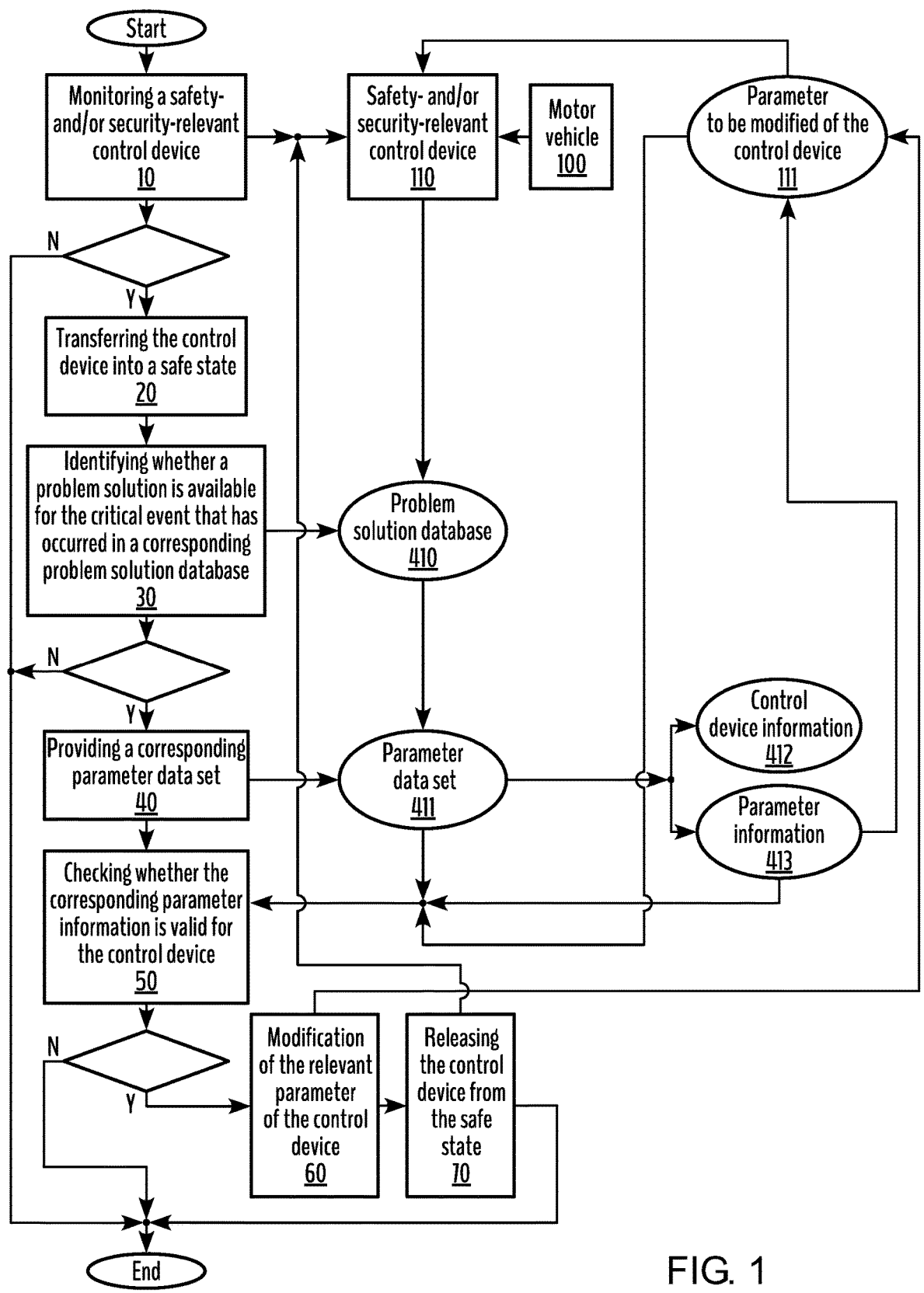
FIG. 1 is a schematic illustration of a proposed method according to an exemplary embodiment of the invention.

FIG. 1 shows a schematic illustration of a proposed method according to an exemplary embodiment of the invention.

FIG. 1 thus shows a schematic representation of a method for modifying safety and/or security-relevant control devices 110 in a motor vehicle 100. The method comprises: monitoring 10 of a safety and/or security-relevant control device 110 of the motor vehicle 100. If a critical event occurs during monitoring 10 of the control device 110: transferring 20 the control device 110 into a safe state with regard to the critical event. Identifying 30 whether or not a problem solution is available for the critical event that has occurred by way of a parameter modification of the control device 110 in a corresponding problem solution database 410. And if the problem solution is available: deployment 40 of a corresponding parameter data set 411 from the problem solution database 410. The parameter data set 411 comprises a control device information item 412 with regard to a control device to be modified, and a parameter information item 413 with regard to a parameter to be modified 111 of the control unit to be modified. And the control unit to be modified corresponds to the control unit 110 of the motor vehicle 100. In addition, the method comprises, in the event that the problem solution is available: checking 50 for each parameter information item 413 contained in the parameter data set 411 whether the corresponding parameter information item 413 relating to the corresponding parameter 111 to be modified of the control device to be modified is valid for the control device 110 of the motor vehicle 100. And if the corresponding parameter information item 413 is valid, the method further comprises: modifying 60 the corresponding parameter 111 of the control device 110 of the motor vehicle 100 in accordance with the corresponding parameter information item 413 and releasing 70 the control device 110 from the safe state.

Figure 2:
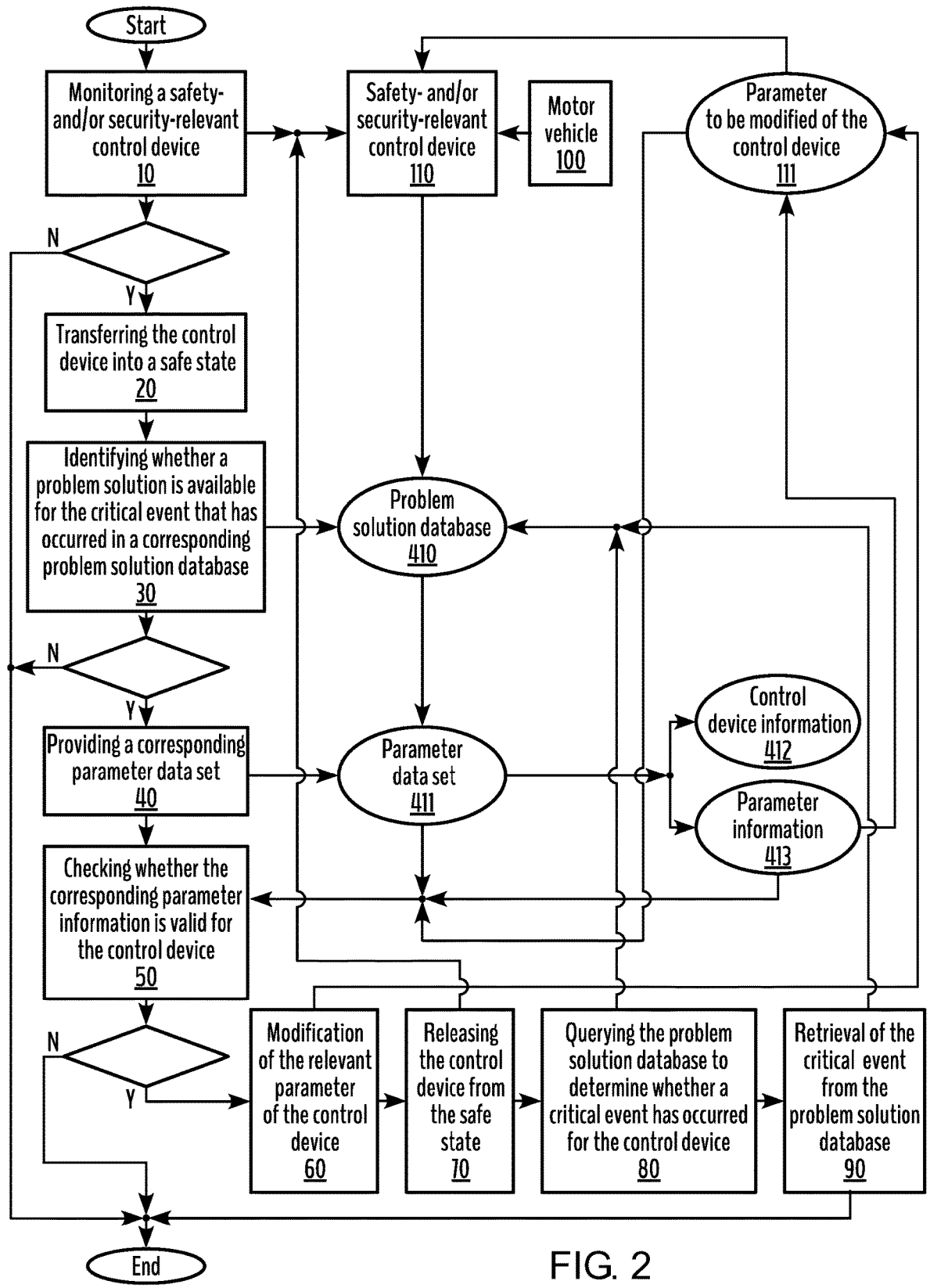
FIG. 2 is a schematic representation of a proposed method in accordance with another exemplary embodiment of the invention.

FIG. 2 shows a schematic illustration of a proposed method according to a further exemplary embodiment of the invention.

FIG. 2 thus shows a schematic illustration of a further developed method with respect to that of FIG. 1. The comments made above for FIG. 1 therefore also apply to FIG. 2.

FIG. 2 shows the method of FIG. 1 in which the method also comprises: querying 80 the problem solution database 410 to determine whether a critical event has occurred for the control unit 110, and if a critical event has occurred: retrieval 90 of the critical event from the problem solution database 410. And in this case the problem solution database 410 is queried 80 upon starting to use the motor vehicle 100 and/or at regular intervals.

Figure 3:
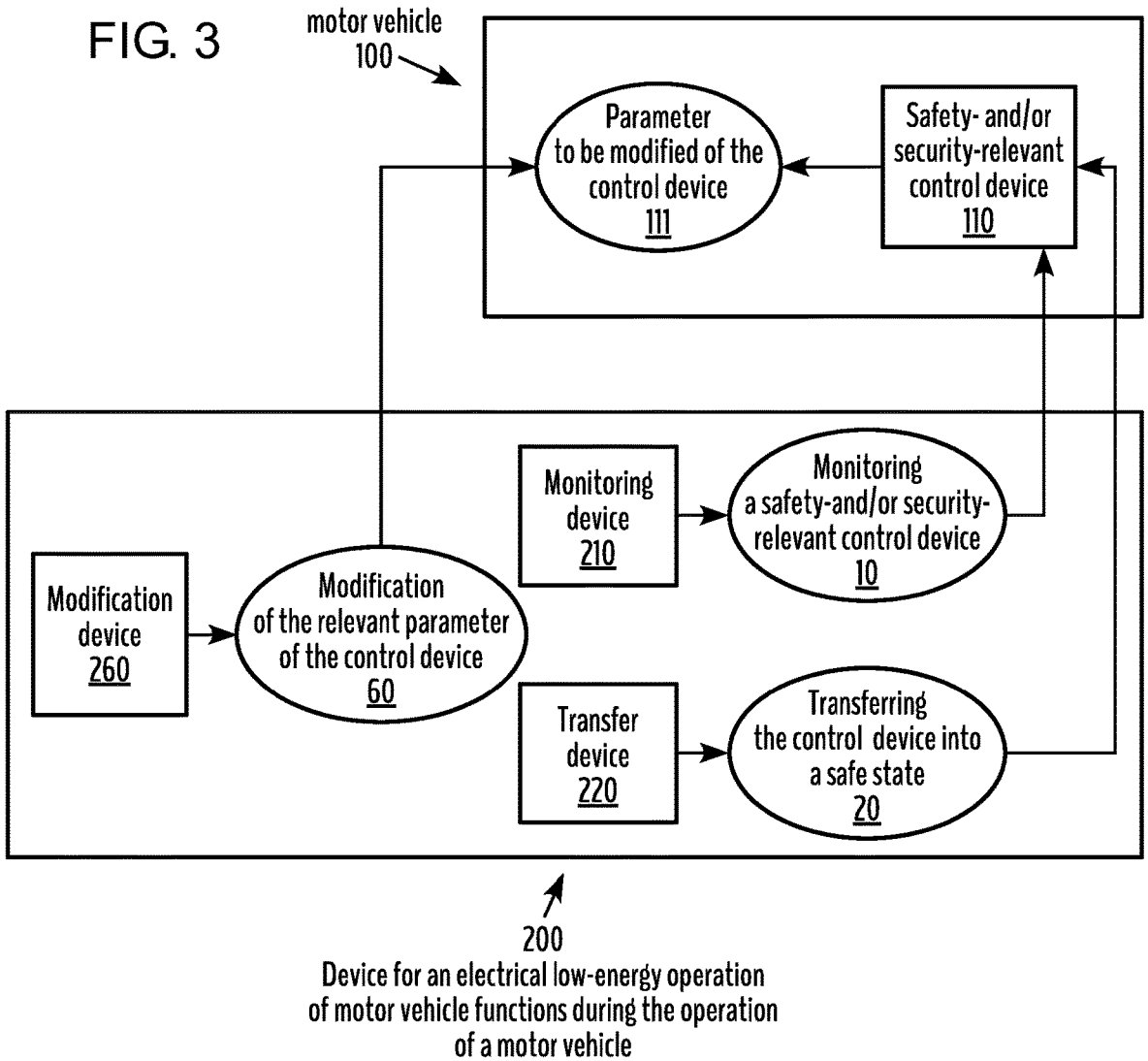
FIG. 3 is a schematic illustration of a proposed apparatus according to a further exemplary embodiment of the invention.

FIG. 3 shows a schematic illustration of a proposed apparatus according to a further exemplary embodiment of the invention.

FIG. 3 thus shows a schematic representation of a device for modifying safety and/or security-relevant control devices 110 in a motor vehicle 100. The apparatus 200 here comprises: a monitoring device 210, for monitoring 10 a safety and/or security-relevant control device 110 of the motor vehicle 100 with regard to a critical event; a transfer device 220 for transferring 20 the control device 110 into a safe state with regard to the critical event; and a modification device 260, for modifying 60 a corresponding parameter 111 of the control device 110 of the motor vehicle 100. And, the apparatus 200 is configured to execute any method according to the invention.

The idea of the invention can be summarized as follows. A method, a corresponding apparatus and a motor vehicle are provided, which can make it possible for the available parameter sets for certain functions and/or control devices in the vehicle to be modified by way of a query initiated by either the vehicle or the associated functions to a backend or server. In particular, this can also be done on a temporary basis.

In the vehicle the stored parameters for functions or control devices are considered to be, so to speak, default values of the parameter sets for the corresponding functions or control devices. These parameter sets can be changed as needed with the proposed invention, by a corresponding problem solution being requested or transmitted from a problem database, the solution comprising an appropriate parameter information item as a workaround of the corresponding default parameter value of the corresponding parameter of the corresponding control device. The effectiveness of the corresponding parameter or parameter set with regard to the problem solution of the critical event can be verified or certified in advance where appropriate.

Under certain circumstances, such as every x minutes/hours/days, each time the vehicle is started, on every x-th feature activation, every x kilometers, depending on the position of the vehicle, in the event that a critical event occurs, depending on the driver or else at the request of a vehicle user and so on, a connection to a problem database is established where further problem solutions are sought. This can be carried out with regard to a known critical event to search for an appropriate solution of a known problem or a problem that has arisen, respectively.

In other words, the motor vehicle and/or a corresponding apparatus of the vehicle, builds by itself an online connection to the backend, fetches from the backend an optimal parameterization determined/calculated in the backend as parameter information and overwrites the default values with these optimal parameter values. In particular, this overwriting can be temporary, so that the default values are not lost.

The temporary values are only valid for a certain period of time, so that after the expiry of the period of validity the function is no longer parameterized with the temporary values from the backend, but with the default values again. The default values can also have the effect that the function can only be operated essentially in a limited way and can be used with its full functionality only by means of temporarily valid parameter sets, which can be retrieved, for example, from the backend.

It is also possible that these parameter sets only function temporarily and thus must be constantly updated to be able to continue to use the full functionality.

A function or control unit designed in such a way, such as the driver assistance function "automatic daytime running lights", would under certain circumstances or triggering conditions therefore request a suitable parameterization in the backend. Such a parameterization in the example of the automated daytime running lights could be that, in a country in which the use of daytime running lights on cars is prohibited by law, the parameter information for the corresponding driver assistance function, or for the corresponding control unit, has the value "0", i.e. "Off". In contrast, the default value can have a "1", i.e. "On", for the case where this driver assistance function is activated.

A particularly difficult problem here is the period from the fault symptom becoming apparent, such as a malfunction, through an analysis of the cause of the fault, development of the fault correction, for example, development and testing of the software update, up to the deployment of the fault solution to the worldwide distributors, workshops and the like. This period of fault analysis and development of a fault resolution can sometimes take many weeks. The invention also aims, among other things, to address the impact of faults or problems, in particular safety and/or security-relevant problems occurring precisely in this fault analysis period, without having a suitable software update to hand. This may allow function downgrades to be coped with. Conversely, the invention can be used to continuously check whether a function is still deemed to be safe, and to only allow activation of the function or function versions if the function is still deemed to be safe, for example in the backend.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 10 monitoring a safety- and/or security-relevant control device
20 transferring the control device into a safe state
30 identifying whether a problem solution is available for the critical event that has occurred in a corresponding problem solution database
40 providing a corresponding parameter data set
50 checking whether the corresponding parameter information is valid for the control device
60 modification of the relevant parameter of the control device
70 releasing the control device from the safe state
80 querying the problem solution database to determine whether a critical event has occurred for the control unit
90 retrieval of the critical event from the problem solution database
100 motor vehicle
110 safety- and/or security-relevant control device
111 parameter to be modified of the control device
200 apparatus
210 monitoring device
220 transfer device
230 communication device
260 modification device
400 server
410 problem solution database
411 parameter data set
412 control device information
413 parameter information

What is claimed is:

1. A method for modifying safety and/or security-relevant control devices in a motor vehicle, said method comprising the steps of:
monitoring a safety and/or security-relevant control device of the motor vehicle, wherein
when a critical event occurs during monitoring of the control device:
transferring the control device into a safe state with regard to the critical event,
identifying whether or not a problem solution is available for the critical event that has occurred by way of a parameter modification of the control device in a corresponding problem solution database stored internally to the motor vehicle, and
when the problem solution is available:
providing a corresponding parameter data set from the problem solution database, wherein the parameter data set comprises:
control device information relating to a control device to be modified, and
parameter information relating to a parameter to be modified of the control device to be modified; and wherein
the control device to be modified corresponds to the control device of the motor vehicle,
checking for each parameter information item contained in the parameter data set provided from the problem solution database stored internally to the motor vehicle, whether the corresponding parameter information item relating to the corresponding parameter to be modified of the control device to be modified is valid for the control device of the motor vehicle such that the corresponding parameter information item is designed for the motor vehicle or the control device to be modified, and
if the corresponding parameter information item is valid:
modifying the corresponding parameter of the control device of the motor vehicle in accordance with the corresponding parameter information item, and
releasing the control device from the safe state.

2. The method as claimed in claim 1, wherein the critical event comprises a safety and/or security-relevant critical event.

3. The method as claimed in claim 1, wherein the occurrence of the critical event can be triggered from a vehicle-external server and/or a cloud.

4. The method as claimed in claim 1, said method further comprising the steps of:
querying the problem solution database to determine whether a critical event has occurred for the control device, and
if a critical event has occurred:
retrieving of the critical event from the problem solution database, wherein
the problem solution database is queried when starting to use the motor vehicle and/or at regular intervals.

5. The method as claimed in claim 1, wherein
the motor vehicle is a motor vehicle operable in a highly automated way,
the control device is safety and/or security-relevant for a highly automated operation of the motor vehicle,
the critical event is a critical event for the highly automated operation of the motor vehicle, and
the safe state comprises a safe state with regard to the highly automated operation of the motor vehicle.

6. An apparatus for modifying safety and/or security-relevant control devices in a motor vehicle, said apparatus comprising:
a monitoring device, for monitoring a safety and/or security-relevant control device of the motor vehicle with regard to a critical event,
a transfer device for transferring the control device into a safe state with regard to the critical event, and
a modification device, for modifying a corresponding parameter of the control device of the motor vehicle, and wherein
the apparatus is configured to carry out the acts of:
monitoring a safety and/or security-relevant control device of the motor vehicle, wherein
if a critical event occurs during monitoring of the control device:
transferring the control device into a safe state with regard to the critical event, identifying whether or not a problem solution is available for the critical event that has occurred by way of a parameter modification of the control device in a corresponding problem solution database stored internally to the motor vehicle, and if the problem solution is available:
providing a corresponding parameter data set from the problem solution database, wherein the parameter data set comprises:
control device information relating to a control device to be modified, and
parameter information relating to a parameter to be modified of the control device to be modified; and wherein
control device to be modified corresponds to the control device of the motor vehicle, checking, for each parameter information item contained in the parameter data set provided from the problem solution database stored internally to the motor vehicle, whether the corresponding parameter information item relating to the corresponding parameter to be modified of the control device to be modified is valid for the control device of the motor vehicle such that the corresponding parameter information item is designed for the motor vehicle or the control device to be modified, and if the corresponding parameter information item is valid:
modifying the corresponding parameter of the control device of the motor vehicle in accordance with the corresponding parameter information item, and
releasing the control device from the safe state.

7. The apparatus as claimed in claim 6, the apparatus further comprising:
a communication device for communication with a vehicle-external server, wherein the vehicle-external server comprises a problem solution database.

8. A motor vehicle, comprising an apparatus as claimed in claim 6.

9. A computer program product comprising a non-transitory computer readable medium having stored thereon program code that, when executed, carries out the acts of:
monitoring a safety and/or security-relevant control device of a motor vehicle, wherein
if a critical event occurs during monitoring of the control device:
transferring the control device into a safe state with regard to the critical event,
identifying whether or not a problem solution is available for the critical event that has occurred by way of a parameter modification of the control device in a corresponding problem solution database stored internally to the motor vehicle, and
if the problem solution is available:
providing a corresponding parameter data set from the problem solution database, wherein the parameter data set comprises:
control device information relating to a control device to be modified, and
parameter information relating to a parameter to be modified of the control device to be modified; and wherein
the control device to be modified corresponds to the control device of the motor vehicle, checking, for each parameter information item contained in the parameter data set provided from the problem solution database stored internally to the motor vehicle, whether the corresponding parameter information item relating to the corresponding parameter to be modified of the control device to be modified is valid for the control device of the motor vehicle such that the corresponding parameter information item is designed for the motor vehicle or the control device to be modified, and if the corresponding parameter information item is valid:
modifying the corresponding parameter of the control device of the motor vehicle in accordance with the corresponding parameter information item, and
releasing the control device from the safe state.

10. The method as claimed in claim 1, wherein the control device information identifies the control device to be modified.

11. The apparatus as claimed in claim 6, wherein the critical event comprises a safety and/or security-relevant critical event.

12. The apparatus as claimed in claim 6, wherein the occurrence of the critical event can be triggered from a vehicle-external server and/or a cloud.

13. The apparatus as claimed in claim 6, wherein
the motor vehicle is a motor vehicle operable in a highly automated way,
the control device is safety and/or security-relevant for a highly automated operation of the motor vehicle,
the critical event is a critical event for the highly automated operation of the motor vehicle, and
the safe state comprises a safe state with regard to the highly automated operation of motor vehicle.

14. The apparatus as claimed in claim 6, wherein the control device information identifies the control device to be modified.

15. The computer program product of claim 9, further comprising program code that, when executed, carries out the acts of:
querying the problem solution database to determine whether a critical event has occurred for the control device, and
if a critical event has occurred:
retrieving of the critical event from the problem solution database, wherein
the problem solution database is queried when starting to use the motor vehicle and/or at regular intervals.

16. The computer program product of claim 9, wherein
the motor vehicle is a motor vehicle operable in a highly automated way,
the control device is safety and/or security-relevant for a highly automated operation of the motor vehicle,
the critical event is a critical event for the highly automated operation of the motor vehicle, and
the safe state comprises a safe state with regard to the highly automated operation of the motor vehicle.

17. The computer program product of claim 9, wherein the critical event comprises a safety and/or security-relevant critical event.

18. The computer program product of claim 9, wherein the occurrence of the critical event can be triggered from a vehicle-external server and/or a cloud.

* * * * *